United States Patent [19]

Donnici

[11] 3,893,757

[45] July 8, 1975

[54] SOUND-AND-PICTURE-ON-FILM REPRODUCING SYSTEM

[75] Inventor: Kenneth Li Donnici, Brooklyn, N.Y.

[73] Assignee: Avom Inc., Lynbrook, N.Y.

[22] Filed: June 1, 1973

[21] Appl. No.: 366,160

[52] U.S. Cl......... 352/78 R; 242/55.19 A; 242/192; 242/194; 352/156
[51] Int. Cl.²................... G03B 23/02; G03B 01/22
[58] Field of Search .......... 242/194, 192, 197, 68.3, 242/71.2, 71.1, 55.19 A; 352/72, 78 R, 156

[56] References Cited
UNITED STATES PATENTS

| | | | |
|---|---|---|---|
| 3,570,780 | 3/1971 | Pastor | 242/194 |
| 3,700,188 | 10/1972 | Bradford et al. | 242/194 |
| 3,756,521 | 9/1973 | Werner | 242/194 |
| 3,783,197 | 1/1974 | Towner | 242/192 |

FOREIGN PATENTS OR APPLICATIONS

| 1,202,047 | 7/1959 | France | 242/194 |
|---|---|---|---|

*Primary Examiner*—George F. Mautz
*Attorney, Agent, or Firm*—Ernest F. Marmorek

[57] ABSTRACT

A sound-and-picture-on-film reproducing system in which a film cartridge contains coaxially disposed supply and take-up reels which can be reversibly operated in a play-back mode in addition to the conventional forward and freeze modes and in which a novel slip clutch compensates for varying tape diameters on the reels and the associated velocity changes and including an improved projection unit adapted to operate on both conventional and reversible cartridges with interlocking features.

3 Claims, 8 Drawing Figures

SOUND-AND-PICTURE-ON-FILM REPRODUCING SYSTEM

FIELD OF THE INVENTION

The present invention relates generally to sound-and-picture-on-film reproducing systems, and more particularly relates to such systems which include a readily interchangeable film cartridge.

BACKGROUND OF THE INVENTION

Heretofore sound-and-picture-on-film reproducing systems have been known to include a basic film reproducing apparatus and a readily interchangeable film-carrying magazine, commonly known as a film cartridge, in which the film cartridge is readily engageable and disengageable with the basic film-driving devices provided in the reproduction apparatus and in which the film cartridge includes only non-driving, passive, film-guiding rolls and channels. The known film cartridges are provided with a single film-carrying reel and became known widely as the so-called continuous-loop cartridges in which a single spool or reel having a central hub is journalled on an axle means secured in the base of the housing of the cartridge. The single reel is designed to receive a film in the form of an endless belt wound on the hub which during the operation is fed from the central hub over a guide through the film-guiding elements in the cartridge and is rewound on the outer periphery of the film stock on the hub after passing the reproduction elements.

Such well-known continuous-loop systems have the disadvantage that they can be operated only in a single direction due to the nature of the winding of the film, therefore, with such continuous-loop devices it is not possible to return the film to a certain frame by reversing its direction, which operation is known in the film industry as an instant-replay operation, and which is very desirable, when the film is used in visual instructions or in sports casting.

Examples of continuous-loop film reproducing systems are demonstrated by the subject matter of U.S. Pat. Nos. 3,244,469 and 3,244,470 both patented on Apr. 5, 1966 and assigned to the Fairchild Camera and Instrument Corporation. Reference should be had to such patents for any additional description of the nature and operation of conventional elements in a film reproducing system employing an interchangeable single-reel film cartridge.

SUMMARY OF THE INVENTION

It is, therefore, an object of the present invention to provide a sound-and-picture-on-film reproducing system including a readily interchangeable film cartridge, wherein a reversible operation of the film dispensing means is possible, thereby enabling a quick replay of earlier played scenes on the film strip.

It is another object of the present invention to provide the film reproducing system of the above kind, in which a replay of earlier scenes of the film strip is possible without the necessity of the film leaving the cartridge enclosure and entering the inside of the reproduction apparatus and therefore without the necessity of any mechanical means entering the inside of the cartridge itself in order to extract the film strip during the play-back operation.

It is a further object of the present invention to provide the film reproducing system of the above kind in which a novel reproduction apparatus is provided having controls enabling the operation of the novel reversible film cartridge according to the present invention and which is capable of operating also on a film cartridge of the conventional continuous-loop type by the provision of means accommodating for the operation of the two kinds of cartridges.

It is still another object of the present invention to provide a film reproducing system of the above type in which an interlock means is provided to enable a reproducing apparatus having controls enabling the operation on the conventional continuous-loop cartridges as well as on the novel film cartridges according to the present invention, such interlock means preventing the rewinding means from contacting a continuous-loop cartridge but engaging properly with the novel cartridge.

It is still a further object of the present invention to provide a film reproducing system of the above type, wherein an improved slip-clutch means is provided to compensate for the varying diameter of the film on the take-up reel.

It is still a further object of the present invention to provide a novel slip-clutch means for the take-up drive which, when the reversible cartridge according to the present invention is played in the reproducing system, operates as a slip-clutch means and which further operates as a positively-engaged drive when cooperating with a conventional continuous-loop cartridge.

It is yet a further object of the present invention to provide means on the novel cartridge for securing same against forces tending to shift it during the reverse mode of operation.

Accordingly, the invention provides a sound-and-picture-on-film reproducing system in which a film cartridge contains coaxially disposed supply and take-up reels which can be reversibly operated in a replay mode in addition to the conventional forward and freeze modes and in which a novel slip clutch compensates for varying tape diameters on the reels and the associated rotational-velocity changes and including an improved projection unit adapted to operate on both conventional and reversible cartridges with interlocking features.

BRIEF DESCRIPTION OF THE DRAWINGS

The invention will become more readily apparent from the following description of a preferred embodiment thereof, shown, by way of example, in the accompanying drawings, in which:

FIG. 6b is a sectional view along the line 6b—6b of the embodiment shown in FIG. 6a.

DESCRIPTION OF THE PREFERRED EMBODIMENT

Figure 1:
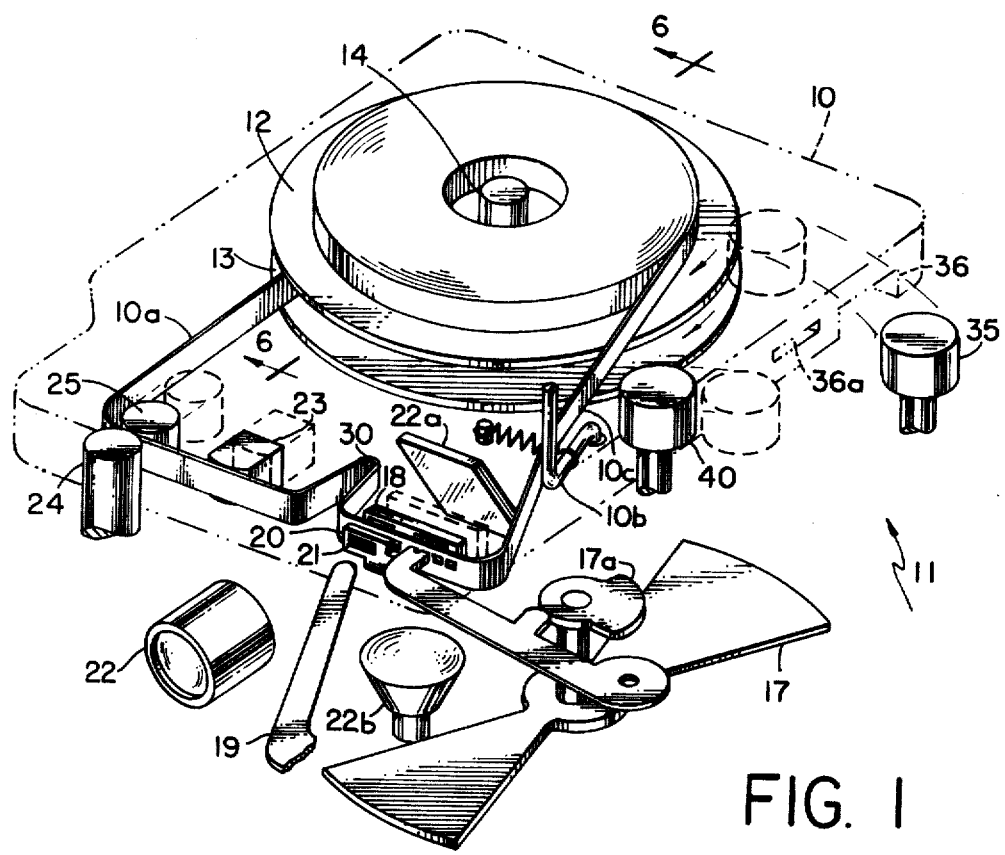
FIG. 1 is a perspective schematic illustration of the novel film cartridge according to the present invention, partially showing some elements of the novel reproducing apparatus, operating in the normal or forward mode.

With reference to FIG. 1 of the drawings illustrating the sound-and-picture-on-film reproducing system in a normal or forward operating mode, it is noted that the system according to the present invention includes a film cartridge 10 which is readily engageable and disengageable with the basic apparatus of the reproduction system as partially illustrated at 11. The film cartridge 10 includes a housing which can be of a molded thermoplastic resin having a base portion and a detachable cover. In the housing a supply reel 12 and a take-up reel 13 are mounted on a central hub 14 as can be seen more clearly in FIG. 4 and are arranged for independent rotation about the hub 14. In the event the supply reel 12 is a commercially available reel, then according to the present invention an adapter 15 is provided so that any commercially available reel could be used with the novel cartridge housing 10 according to the present invention. It is, however, preferred that the supply reel 12 is produced integrally with the adapter 15 enabling the mounting of the supply reel simply by placing it on the hub 14.

During the forward or normal mode of operation the film strip 10a is taken off from the supply reel 12 by the intermittent operation of a oscillating claw 16 which engages the perforations provided in the film strip 10a in a conventional manner. The claw 16 is activated by the cam 17a which could be mounted on a common shaft with the shutter 17 of the projection apparatus 11. The film strip 10a when being removed from the supply reel 12 may pass over a plurality of passive guide rollers and snubbing means 10b provided within the cartridge 10 and also through appropriate channel formations of the cartridge housing which are intended to passively guide and form loop 10c in the film 10a in its path toward the reproduction system 11. The reproduction system includes as its conventional elements, a lens 22, a mirror 22a and a lamp 22b which are arranged across the path of movement of the film 10a which moves between a spring-biased pressure plate 18 and an aperture plate 20 having an aperture 21 therein. The pressure plate 18 may be biased out of operative position by a pusher arm 19 which disengages the pressure plate 18 during the reversing operation of the film 10a.

During the forward or normal operation the film 10a is also driven by a capstan 24 which cooperates with a pinch roller 25 and advances the film in the direction of the arrow in a constant-speed and conventional fashion and provides same with smooth motion required by the sound reproduction system 23.

During the forward mode of operation of the film 10a a loop 30 must be provided within the cartridge for the film to compensate for the different velocities existing at the aperture 21 and the sound system 23. Means for monitoring and adjusting the magnitude of the loop can be provided similar to those discussed in the aforementioned two U.S. patents. The leading edge of film 10a is anchored securely to the hub of the take-up reel 13 and the tail end is anchored securely to the hub of the supply reel 12. When the entire reel has been played and the supply of film 10a on the supply reel 12 has been exhausted, loop 30 will shrink drastically and may either trigger the linkage of FIG. 5 automatically into the rewind mode, or cause the reproduction system to shut down.

During the normal or forward mode of operation the reversing drive puck 35 is disengaged as mentioned hereinafter in connection with the replay or play-back mode of operation of the film cartridge. The novel projection unit adapted for the play-back operation is provided with a take-up drive puck 40 to drive the take-up reel 13 during the forward or normal operating mode of the apparatus. The take-up reel 13 is operated by the take-up drive puck 40 through frictional engagement of the rim of the take-up reel 13.

Of course, for the forward operation of the reproducing apparatus a linkage assembly is provided which will be discussed in more detail in connection with FIG. 5 which assures that the take-up drive puck 40 during the forward or normal mode of operation engages the rim of the take-up reel 13, while the reversing drive puck 32 remains disengaged from the rim of the supply reel 12.

Figure 3A:
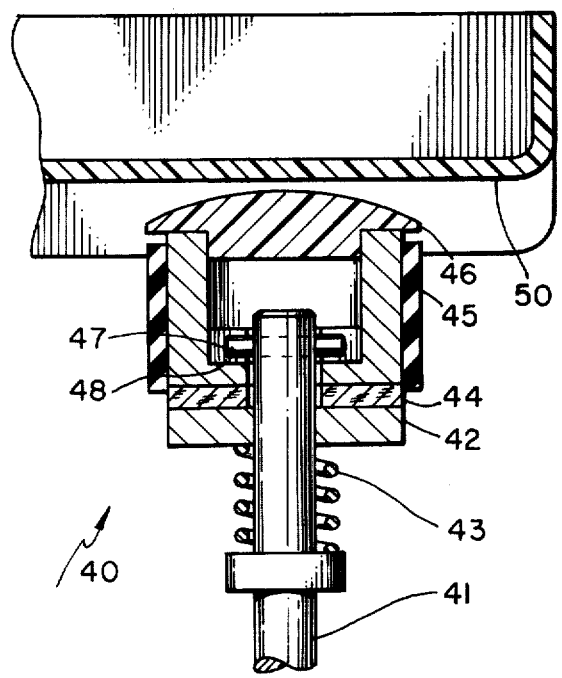
FIG. 3a is a sectional illustration, partly schematic, of the take-up drive puck according to the present invention in an operative position when a continuous-loop type cartridge is in the system.
Figure 3B:
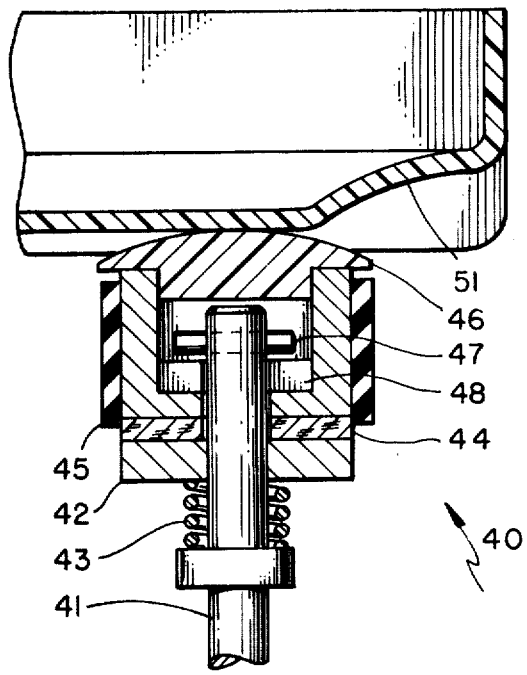
FIG. 3b is a similar illustration of the take-up drive puck as in FIG. 3a except in an operational position when a reversible reel cartridge of the present invention is operated within the reproduction system.

With respect to the dual function of the novel take-up drive puck 40 as a direct drive and as a slip-clutch device, reference should be had to FIGS. 3a and 3b, of which 3a illustrates the position of the parts of the puck 40 when a continuous-loop type cartridge is used in connection with the reproducing apparatus and, wherein the take-up puck 40 operates on the rim of the single reel of a conventional continuous-loop cartridge as discussed in the aforementioned U.S. patents. The puck 40 is driven through a shaft 41 on which a pressure washer 42 is arranged sitting on a compression spring 43 arranged about the shaft 41 for the purpose hereinafter described, while on the pressure washer 42 a friction washer 44 is seated on which the body of the puck itself is placed and contains an outside friction surface 45 which can be conventionally made from rubber or from a synthetic material having appropriate frictional properties. The body of the puck 40 is sealed on the top by a cap 46. Inside the puck 40 a pin 47 is provided passing through the end of the shaft 41 and which engages in a slot 48 in the body of puck 40 and in such engaged position it rotates the puck 40 at a speed as the shaft 41 rotates. It is noted also in connection with FIG. 3a that the conventional continuous-loop cartridge has a housing formation 50 which is conventionally a recess to provide access for the puck 40 to move into engagement with the rim of the take-up reel 13 and, which housing portion 50 remains clear of the cap 46 of the puck 40 when a continuous-loop cartridge is played. In other words, the puck 40 acts as a direct drive under such conditions.

Turning now to the showing of FIG. 3b it is noted that the cap 46 of the puck 40 is depressed by a certain amount against the bias of the spring 43 and in this situation the pin 47 is raised out of the slot 48. This is accomplished by the fact that the housing of the reversible cartridge 10 according to the present invention includes a raised portion 51 which in the inserted and engaged position of the cartridge 10 forces the cap 46 of the puck 40 downwardly, thereby the puck 40, in the illustration of FIG. 3b, acts as a slip-clutch and compensates for the different angular velocities of the take-up reel 13 during the removal of film strip 10a from the supply reel 12. The friction drive is performed through washer 44.

The drive washer 42 is arranged so as to permit it to slide longitudinally along shaft 41 but always to be driven in rotation together with shaft 41 such as would be the case, for example, is shaft 41 were a male spline and drive washer 42 were the female. The configuration and material of cap 46 is such as to reduce frictional losses when engaged by the raised portion 51 of the reversible cartridge 10.

Figure 2:
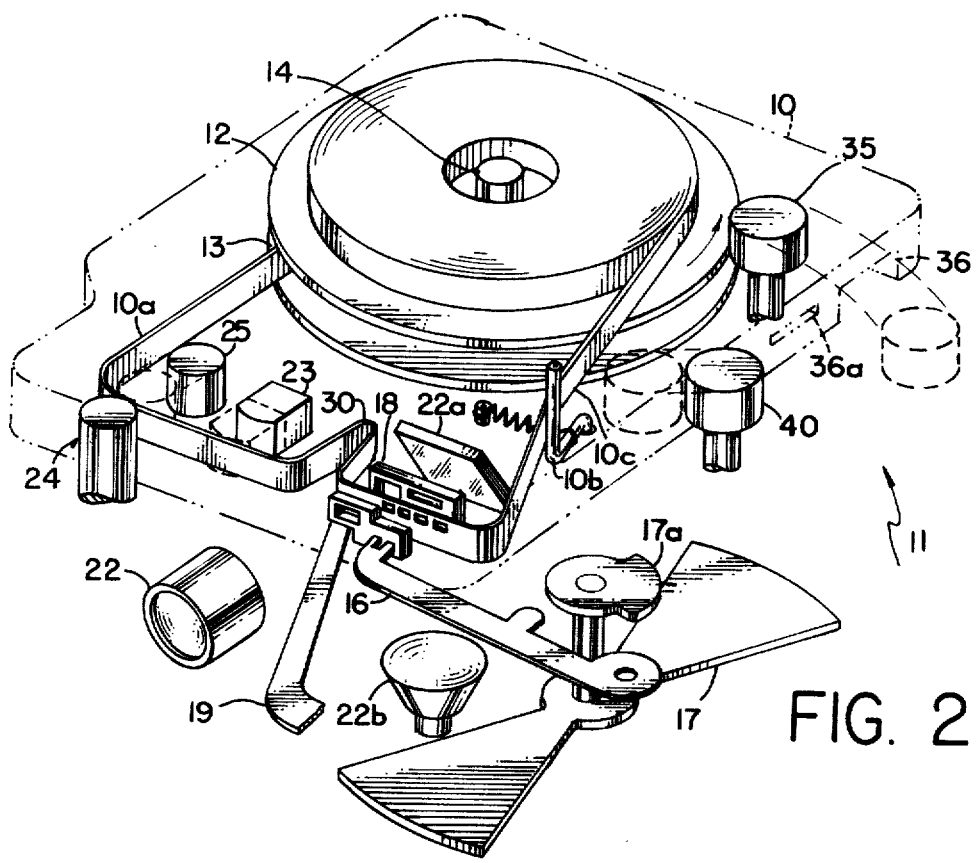
FIG. 2 is a similar illustration of the novel film cartridge of the present invention as in FIG. 1, except it is shown as being operated in the reverse mode.

Now with reference to FIG. 2 illustrating the playback type cartridge 10 according to the present invention operating in the reverse mode, it is seen that the claw 16, the pressure plate 18 are out of engagement from the film 10a, the pinch roller 25, the sound assembly 23 and the take-up drive puck 40 are also disengaged. On the other hand, the reversing drive puck 35 enters a guide recess 36 provided in the housing of the cartridge 10 and comes into engagement with the rim of the supply reel 12 and drives it back in the direction of the arrow in FIG. 2. It is also possible, under certain conditions, to keep the pressure plate 18 in engagement with the film 10a during the reverse mode and thereby eliminate the need for the pusher arm 19.

Figure 5:
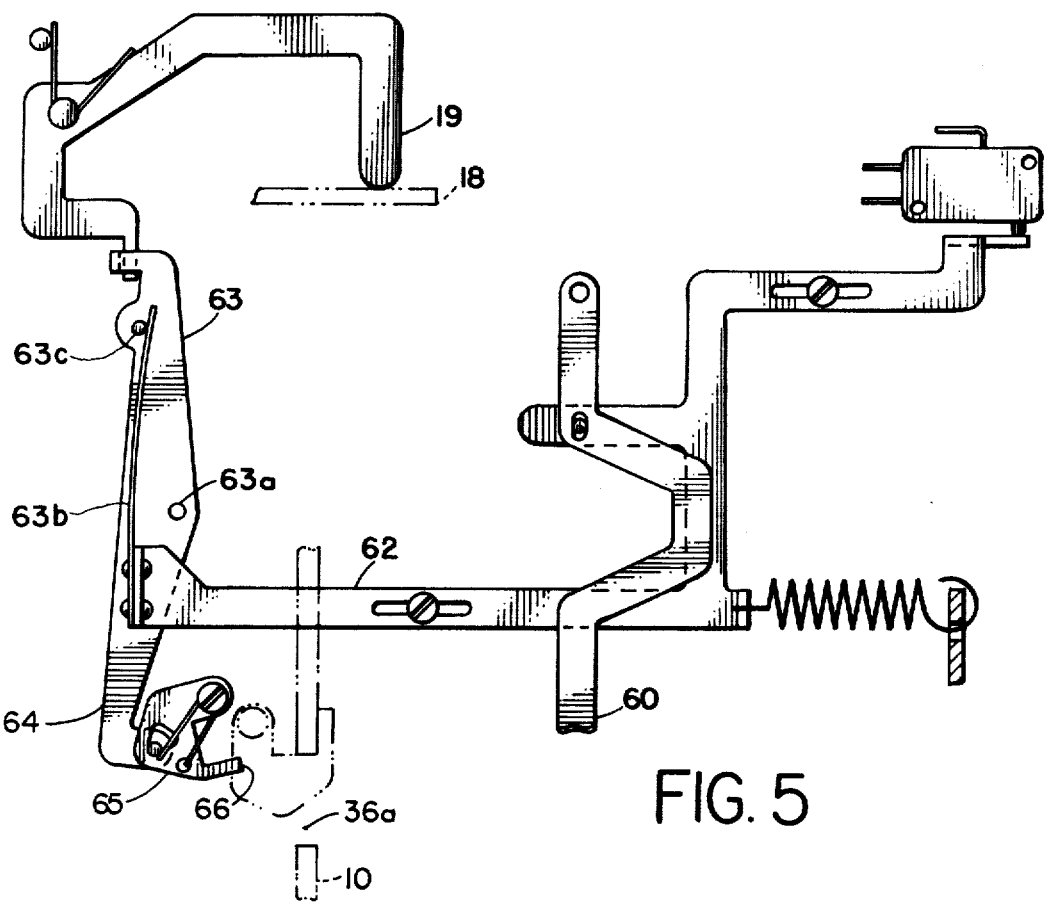
FIG. 5 is schematic partial illustration of the control levers in the novel projection apparatus enabling the projection apparatus to operate with the various film cartridges such as the continuous-loop cartridge or the reversible type cartridge according to the present invention.

With reference to FIG. 5 illustrating in a partial manner the operating linkages in the projection apparatus 11, to an extent necessary to understand operation of the present invention, a lever 60 has a handle which can be set into three positions, namely the normal forward operation, a freeze-frame operation, and a rewind, or reverse, operation. For illustrative purposes and, as an example of the illustration of the reverse operation of the linkages of FIG. 5, it is noted that if the lever 60 is pushed to the left, then the linkage assembly 62 moves also to the left which causes the pivot 63 to pivot about a pin 63a due to lever 63b acting on pin 63c and by its arm 64 causes the coupled cradle 65 to rotate and with its finger 66 enter a sensing notch 36a provided in the housing of the cartridge 10. The effect of the entry of finger 66 into notch 36a is to provide a securing of the cartridge 10 against forces which would tend to shift or rotate it when the apparatus is in its reverse mode of operation due to the force of the rewind puck 35.

It is noted that the invention provides a safety measure in the event a conventional continuous-loop type cartridge is used with the improved replay-type projection apparatus, in order to avoid damage in the event the user pushes the controls illustrated in FIG. 5 for replay operation while a continuous-loop type cartridge is in the machine. Such a continuous-loop cartridge not having the notch 36a, the rewind puck 35 is reliably prevented from engaging the side of the single-reel continuous-loop cartridge and thereby the linkage of FIG. 5 cannot assume the reverse position.

Figure 4:
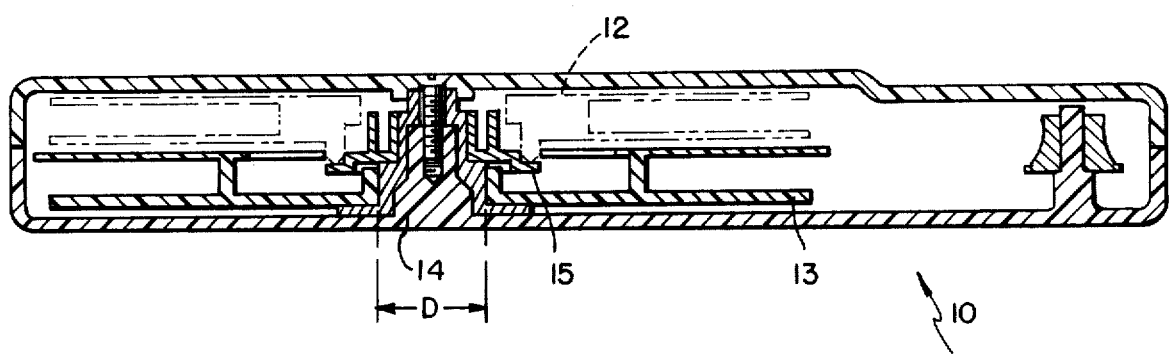
FIG. 4 is a sectional view taken substantially along the line A—A of FIG. 1, illustrating the relative positioning of the supply and take-up reels of the novel film cartridge of the present invention.
Figure 6B:
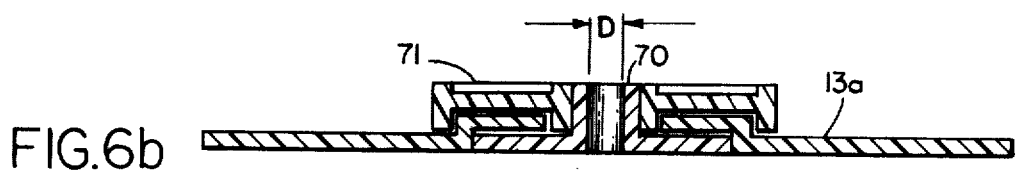
Figure 6A:
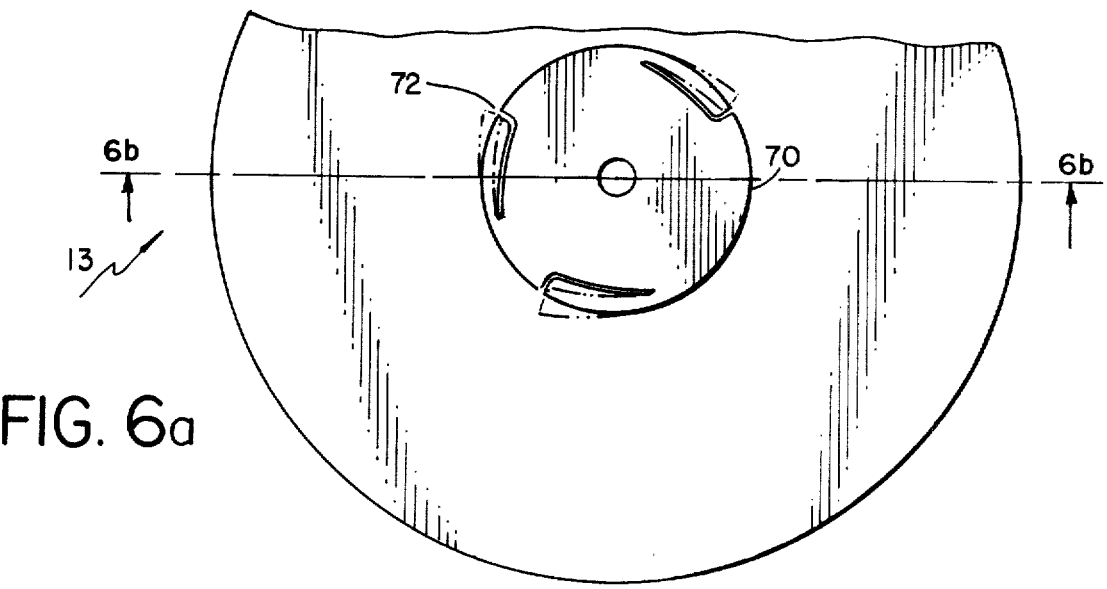
FIG. 6a is an alternative embodiment for the slip control arrangement according to the present invention.

An alternative embodiment is provided according to the present invention for the slip-clutch arrangement of FIGS. 3a and 3b, and with respect to such alternative embodiment reference should be had to FIG. 6a and 6b which show a take-up reel 13 having a center core or hub 70 having diameter D in which exemplarily three slots 72 are provided. Reference should also be had to FIG. 4 wherein diameter D is shown. Due to the slotting the slotted parts 72 behave resiliently in engaging the flange 13a of the reel 13. The hub 71 is press-fit onto the center core 70. The slotted parts which can be in the form of tabs molded in such a manner that they are somewhat protruding thereby, when the flange 13a is pressed on them, they provide a frictional engagement with the flange when assembled. Thus, the puck drive at the rim of the flange 13a can rotate the flange 13a with respect to the hub 71 on which the film is disposed, and thereby compensate for the difference in speed between the reel 13 and the other reel used in conjunction with the reel 13. By way of comparison, the embodiment shown in FIG. 3b permits cap 46 to slip with respect to the shaft 41.

It has been now shown that the replay type film cartridge according to the present invention provides an additional mode of operation for a cartridge type film reproducing apparatus which the instant-replay mode acquires more and more significance in connection with visual instruction either individual or in a class room or in the showing of sport events. The reversible cartridge is interchangeable with a continuous-loop cartridge in the improved reproduction apparatus which according to the present invention is adapted to operate on both type of cartridges.

I wish it to be understood that I do not desire to be limited to the exact details of construction shown and described, for obvious modifications will occur to a person skilled in the art.

Having thus described the invention, what I claim as new and desire to be secured by letters Patent, is as follows:

1. A film magazine for use with a film strip having uniformly spaced perforations near one edge for a sound-and-picture reproducing system including a drive puck having engaging and disengaging positions and a play-back drive puck having engaging and disengaging positions, said magazine comprising, in combination:

a housing;

a central hub disposed within said housing and having first and second coaxial shoulders;

a take-up reel having a rim rotatably mounted on said first shoulder and including a central portion for frictionally engaging said hub;

a supply reel having a rim rotatably mounted on said second shoulder, said supply reel and said take-up reel being independently rotatable;

a first recess in said housing for receiving said drive puck throughout at least part of its path to and from its engaging position at which it engages and drives a rim portion of said take-up reel;

a second recess in said housing for receiving said play-back drive puck throughout at least part of its path to and from its engaging position at which it engages and drives a rim portion of said supply reel;

projecting means for projecting an image on a portion of said film in a predetermined projecting position;

claw means operable for engaging said perforations at predetermined intervals of time and thereby to move successive portions of said film into said projecting position; and snubbing means cooperating with said claw means for regulating the movement of said film transferred between said reels said central hub being molded plastic and including a plurality of resilient tabs molded to engage frictionally said take-up reel central portion.

2. A film magazine for use with a film strip having uniformly spaced perforations near one edge for a sound-and-picture reproducing system including a drive puck having engaging and disengaging positions and a play-back drive puck having engaging and disengaging positions, said magazine comprising, in combination:

a housing;

a central hub disposed within said housing and having first and second coaxial shoulders;

a take-up reel having a rim rotatably mounted on said first shoulder;

a supply reel having a rim rotatably mounted on said second shoulder, said supply reel and said take-up reel being independently rotatable;

a first recess in said housing for receiving said drive puck throughout at least part of its path to and from its engaging position at which it engages and drives a rim portion of said take-up reel;

a second recess in said housing for receiving said play-back drive puck throughout at least part of its path to and from its engaging position at which it engages and drives a rim portion of said supply reel;

projecting means for projecting an image on a portion of said film in a predetermined projecting position;

claw means operable for engaging said perforations at predetermined intervals of time and thereby to move successive portions of said film into said projecting position; and snubbing means cooperating with said claw means for regulating the movement of said film transferred between said reels, said reproducing system including a linkage means having at least forward and reverse positions for engaging and disengaging said pucks, said magazine further comprising a third recess in said housing for said linkage means to interlock said magazine when said play-back puck is engaged.

3. A film magazine for use with a film strip having uniformly spaced perforations near one edge for a sound-and-picture reproducing system including a drive puck having first and second engaging positions, said first engaging position being a direct drive for said drive puck, and said second engaging position being a slip-clutch drive for said drive puck and a disengaging position and a play-back drive puck having engaging and disengaging positions, said magazine comprising, in combination:

a housing;

a central hub disposed within said housing and having first and second coaxial shoulders;

a take-up reel having a rim rotatably mounted on said first shoulder;

a supply reel having a rim rotatably mounted on said second shoulder, said supply reel and said take-up reel being independently rotatable;

a first recess in the bottom of the housing, said first recess being of a size to receive said drive puck throughout at least part of its path to and from its second engaging position to permit said drive puck to engage and be located to slip-clutch drive a rim portion of said take-up reel;

a second recess in the housing for receiving said play-back drive puck throughout at least part of its path to and from its engaging position at which it engages and drives a rim portion of said supply reel;

projecting means for projecting an image on a portion of said film in a predetermined projecting position;

claw means operable for engaging said perforations at predetermined intervals of time and thereby to move successive portions of said film into said projecting position; and snubbing means cooperating with said claw means for regulating the movement of said film transferred between said reels.

* * * * *

UNITED STATES PATENT OFFICE
CERTIFICATE OF CORRECTION

Patent No. 3,893,757           Dated July 8, 1975

Inventor(s) Kenneth Li Donnici

It is certified that error appears in the above-identified patent and that said Letters Patent are hereby corrected as shown below:

Change the patentee "Donnici" to --Li Donnici--.

Signed and Sealed this sixteenth Day of December 1975

[SEAL]

Attest:

RUTH C. MASON  
Attesting Officer

C. MARSHALL DANN  
Commissioner of Patents and Trademarks